Jan. 6, 1959   J. S. CASE   2,867,101
UNIVERSAL JOINT
Filed June 24, 1957   3 Sheets-Sheet 1

JOHN S. CASE
INVENTOR

BY Walter G. Finch
ATTORNEY

Jan. 6, 1959

J. S. CASE 2,867,101

UNIVERSAL JOINT

Filed June 24, 1957

JOHN S. CASE
INVENTOR

BY Walter G. Finch
ATTORNEY

Jan. 6, 1959    J. S. CASE    2,867,101
UNIVERSAL JOINT
Filed June 24, 1957    3 Sheets-Sheet 3
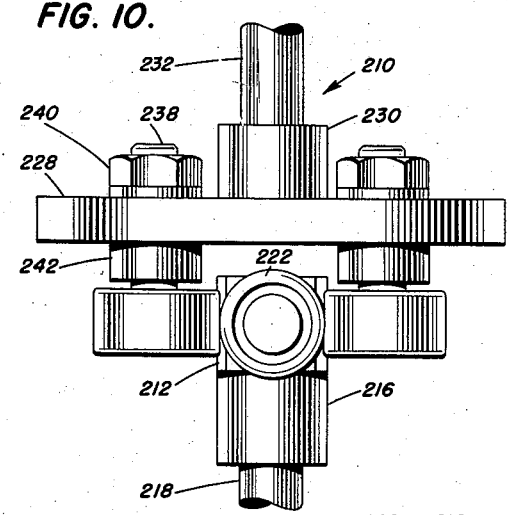
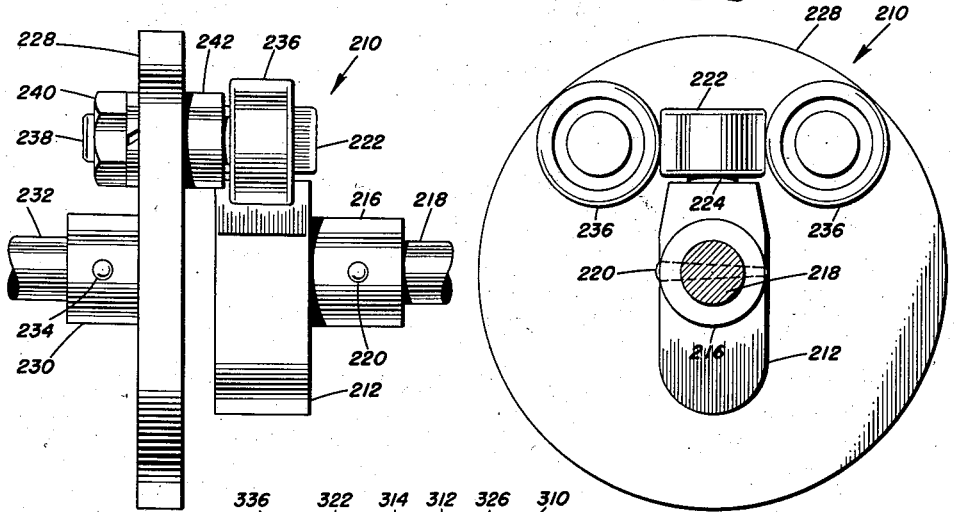
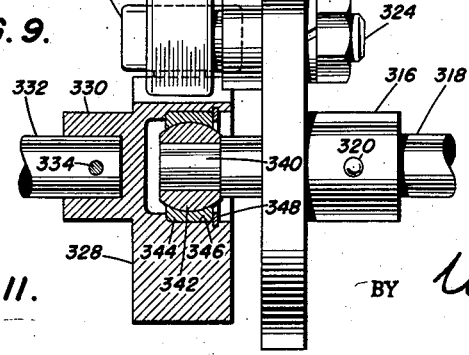
JOHN S. CASE
INVENTOR
BY *Walter G. Finch*
ATTORNEY

United States Patent Office 2,867,101
Patented Jan. 6, 1959

2,867,101

UNIVERSAL JOINT

John S. Case, Baltimore, Md.

Application June 24, 1957, Serial No. 667,469

9 Claims. (Cl. 64—9)

The present invention relates to a coupler for running shafts. More particularly, it relates to a coupler capable of performing the function of a double universal joint in the coupling of shafts which may be both axially and angularly misaligned.

Frequently in the mechanical arts means are required for coupling running shafts which are misaligned both angularly and axially. Heretofore couplers have been employed which are capable of accommodating either one or the other of the conditions of misalignment, but not both. That is, if it were desired to couple parallel shafts which were subject to axial misalignment, a flexible flange type coupler might be employed. If it were desired to couple shafts angularly misaligned, a universal or Hookes type joint might be used. If the axes of the shafts to be joined do not intersect, they cannot be coupled for running by a single universal joint, but use must be made of a double universal joint. Double joints present lubrication problems and increase space requirements and cost. It will therefore be appreciated that in numerous situations, the coupler of the present invention is to be recommended over conventional couplers.

It is an object of the present invention to provide a coupler capable of joining a pair of running shafts whose axes are non-parallel and non-intersecting axes.

It is a further object of the present invention to provide a coupler capable of performing the aforementioned function with a minimum of frictional losses.

Another object of the invention is to provide a coupler for running shafts having non-parallel non-intersecting axes which will function with a minimum amount of backlash.

Other objects and attendant advantages of the invention will become obvious as an understanding of the invention is gained through study of the following detailed description and the accompanying drawings, in which:

Figs. 8, 9 and 10 illustrates in an end view, a plan view and an elevation view, respectively, of a coupler embodying the principles of the coupler of Figs. 1 through 3, but slightly modified thereover; and Fig. 11 is an elevation, partially in cross section, of a modification of the coupler of Fig. 1.

Figure 3:
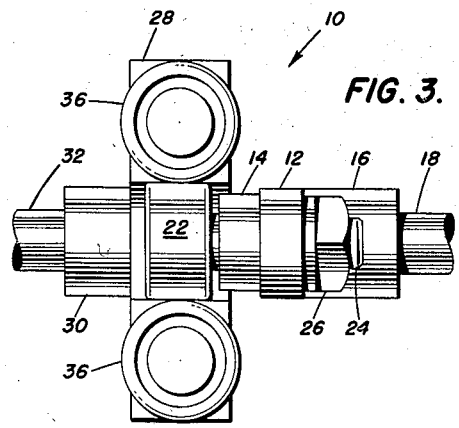
Fig. 3 is a plan view of the coupler.
Figure 1:
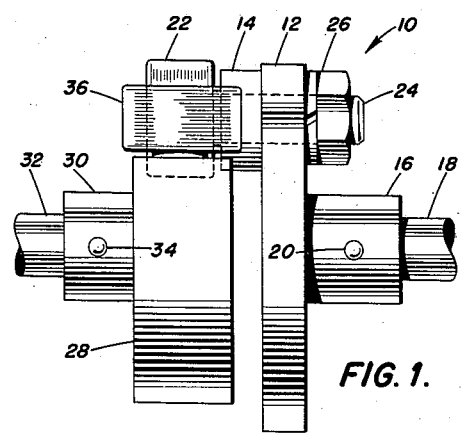
Fig. 1 is an elevation of the coupler of the present invention.
Figure 2:
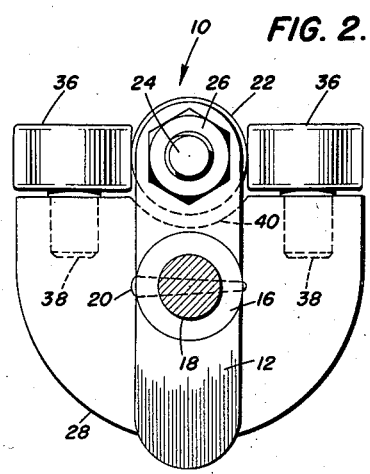
Fig. 2 is an end view of the coupler.

Referring to the drawings, and particularly to Figs. 1 through 3, the coupler 10 of the present invention is illustrated joining a first running shaft 18 with a second running shaft 32. Secured to the first shaft 18 by means of a taper pin 20 is a hub 16 having a crank arm 12 formed perpendicularly thereto. At the outer end of crank arm 12, a roller 22 is secured on an axle 14. Axle 14 is provided with threaded end 24 and is secured to crank 12 by means of a nut 26. Roller 22 is preferably fitted to axle 14 through needle bearings or a similar anti-friction device.

A U-shaped yoke 28 is arranged to face crank arm 12 and is affixed to shaft 32 by a hub 30 and taper pin 34.

A pair of rollers 36 having anti-friction bearings are each rotatably mounted on axles 38 extending vertically from both of the arms of yoke 28. The rollers 36 are mounted so that their axes of rotation lie on a plane perpendicular to the axis of shaft 32 and perpendicular to the plane containing the axis of rotation of roller 22 as shown in Figs. 1 to 3. Roller 22 extends forwardly toward shaft 32 so as to enter the crotch of yoke 28 and bear on the inner edges of the pair of rollers 36. Operating clearances are provided between roller 22 and the pair of rollers 36 to permit shafts 32 and 18 to be coupled in spite of the fact that the axes of the shafts may be non-parallel and non-intersecting.

Figure 4:
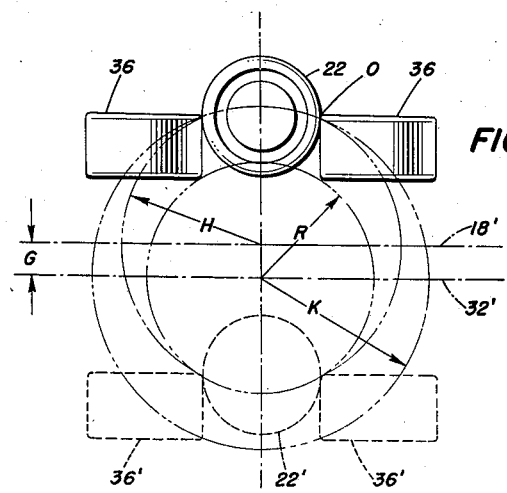
Fig. 4 is a diagram helpful in understanding the mechanics of the operation of the present invention.

The operation of the coupler is explained with the aid of Fig. 4, to which reference is now made. Assuming that the axes of the coupled shafts 18 and 32 are parallel and non-intersecting, the separation between the axes of the shafts is represented by the distance G. As shaft 32 rotates, the remote inner edge O of roller 36 generates a circular locus having a radius K, while the inner edge of roller 36 lying closest to shaft 32 generates a circular locus having a radius R. When the shafts are rotated 180° from the position shown in solid line form to the position represented in dashed line form, the point of contact between roller 22 and rollers 36 will have shifted from the remote inner edges O of rollers 36 to the inner edges of rollers 36 closest shaft 32. Roller 22 must therefore rotate. In cases of no angular misalignment, the rollers 36 do not rotate and may suitably be replaced by rigid extensions of the arms of yoke 28.

If shaft 32 rotates at constant angular velocity $\omega$, the peripheral velocity imparted roller 22 is $K\omega$ in the upper solid-line position of the cycle and $R\omega$ in the lower dotted line position of the cycle, where R and K are the radii of the circles as shown in Fig. 4. The angular velocity $\omega$, of the driven shaft 18 therefore varies between a maximum of K/W and a minimum of $$\frac{R}{H}\omega$$

It is unpractical therefore to construct a coupler having more than one driving roller and one cooperating driven roller system. Otherwise, the driven shaft will be forced to assume simultaneously two different angular velocities, a condition which cannot occur in a rigid assembly without the excitation of undesirable vibrations.

Figure 5:
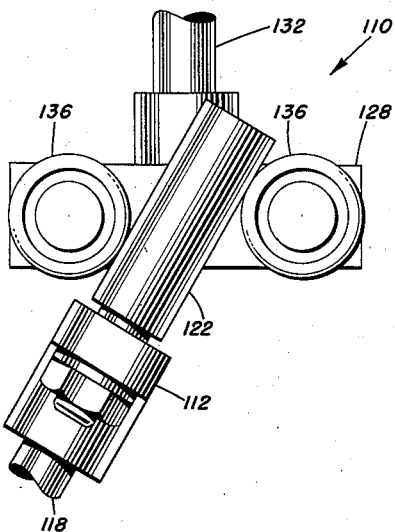
Fig. 5 is a plan view of the invention modified over the embodiment of Fig. 1 to accommodate a greater degree of angular misalignment between the coupled shafts.
Figure 6:
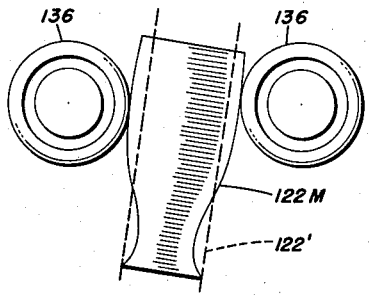
Fig. 6 is a plan view of the coupler further modified over the view of Fig. 5 and which is designed to minimize backlash in applications of fixed angular misalignment.
Figure 7:
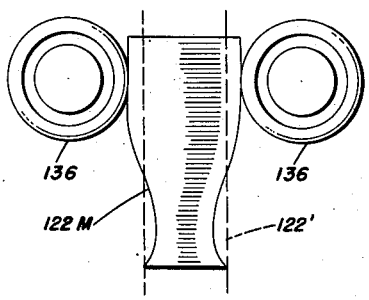
Fig. 7 illustrates the configuration of the elements of the coupler of Fig. 6 after rotation of the coupler 45° from position shown in Fig. 6.

The coupler of Figs. 1 through 3 is capable of accommodating only a limited amount of angular misalignment between the driven and driving shafts. In Fig. 5, a coupler 110 is shown similar to the coupler 10 except for the enlargement of clearances. The arms of yoke 128 affixed to shaft 132 are widened and rollers 136 may be extended in length, as is roller 122 carried by the crank 112 on shaft 118. As shafts 132 and 118 rotate the attitude of roller 122 relative to the rollers 136 will change. The dashed line roller 122' of Figs. 6 and 7 indicate the attitude of roller 122 after rotation of yoke 128 45° and 90°, respectively, clockwise from the position shown in Fig. 5. It will be seen that the clearance between roller 122 and rollers 136 varies appreciably during a cycle. If shafts 118 and 132 are to be operated under known conditions of angular misalignment, that is, if the angular misalignment is not subject to change, but is fixed at an angle of say 30°, roller 122 may be designed to eliminate practically all excess clearance as indicated by the shaped surface of roller 122M.

In Figs. 8 through 10 another coupler 210 embodying the principles of the invention is illustrated in end, elevation, and plan views, respectively. A crank arm 212 having a hub 216 thereon is secured to shaft 218 by means of a taper pin 220. A roller 222 is carried on an axle 224 extending from crank arm 212, and is provided with anti-friction bearings. A disk 228 having a hub 230 formed thereon, is fixed to shaft 232 by means of a taper pin 234. A pair of axles 242 extend parallel to the axis of shaft 232 and are secured near the periphery of disk 228 by nuts 240 drawn onto threaded and portions 238 of said axles. A pair of rollers 236 are mounted on the outer ends of axles 242 with anti-friction bearings so as to engage crank arm roller 222. The usual operating clearance is provided between roller 222 and rollers 236, and although the axes of various rollers in Figs. 8 through 10 are rotated 90° from the axes of the various rollers in Figs. 1 through 3, the operation of the latter device is identical with operation of the former device.

For angular misalignment, this system does not require roller 222 to have a special form. It is, however, necessary to give roller 222 a special form for axial misalignment. The system as shown in Figs. 8 to 11 can be used without a formed roller for angular misalignment while the system as illustrated in Figs. 1 to 3 can be used without a formed roller for axial misalignment. Thus, two different couplings serve two different purposes in the simplest and most effective manner.

In Fig. 11, there is illustrated a universal joint or coupler similar to that disclosed in Fig. 1, with the exception that a spherical bearing 342 has been applied to one reduced end 340 of shaft 318 and a spherical journal 344 has been provided in an aperture 346 in the rotating member 328 carried by the second shaft 332. A snap ring 348 is used to keep the spherical journal 344 in the aperture 346 in rotating member 328. This arrangement requires that only one of the two shafts 318 and 332 be supported, but it can be used only in cases of angular misalignment of the shafts.

Otherwise, elements of components 310, 312, 314, 316, 318, 320, 322, 324, 326, 328, 330, 332, 334, and 336 correspond exactly to elements 10, 12, 14, 16, 18, 20, 22, 24, 26, 28, 30, 32, 34, and 36, respectively, of Fig. 1.

Obviously, many modifications and variations of the invention are possible in the light of the above teachings. It should therefore be understood that the invention is limited solely by the scope of the appended claims.

What is claimed is:

1. A coupler for transmitting motion between a pair of running shafts having non-parallel, non-intersecting axes, comprising a crank secured perpendicular to the axis of one of said shafts, a first roller mounted for rotation at the outer end of said crank, a pair of spaced rollers, and means mounting said pair of spaced rollers for rotation on the other of said shafts, whereby motion of one of said shafts is communicated to the other of said shafts by contact of said first roller with said pair of spaced rollers.

2. A coupler for transmitting motion between a pair of running shafts, comprising, a U-shaped yoke secured to one of said shafts in a plane perpendicular to the axis of said one shaft, a roller mounted for rotation at each of the outer ends of said yoke, a crank arm secured to the other of said shafts in a plane perpendicular to the axis of said other shaft, and a third roller mounted for rotation at the outer end of said crank arm and arranged to contact at least one of said rollers mounted on said yoke for communicating motion between said pair of shafts.

3. A coupler for transmitting motion between a pair of running shafts, comprising, a disk secured perpendicular to one of said shafts, a pair of rollers mounted for rotation near the periphery of said disk, the axes of rotation of said rollers, being parallel to the axis of said first shaft, a third roller, and means mounting said third roller for rotation on the other of said shafts, the axis of rotation of said third roller being perpendicular to the axis of said other shaft.

4. A coupler for transmitting motion between a pair of running shafts having non-parallel, non-interesting axes, comprising, spaced offset means secured to one of said shafts in a plane perpendicular to the axis of said one shaft, spaced rollers mounted for spaced rotation at the outer part of said spaced offset means, other offset means secured to the other of said shafts in a plane perpendicular to the axis of said other shaft, and a third roller mounted for rotation at the outer end of said other offset means and arranged to contact at least one of said spaced rollers mounted on said spaced offset means for communicating motion between said pair of shafts.

5. A coupler as claimed in claim 4 wherein the contact surface of said third roller is curved in the longitudinal direction thereof for the purpose of reducing backlash between said pair of shafts.

6. An arrangement as recited in claim 4, wherein one of said shafts has a recess provided in one of its ends for receiving the end of the other of said shafts, and means, including a self-aligning bearing in said recess for joining the ends of said shafts together.

7. A coupler for transmitting motion between a pair of running shafts having non-parallel, non-intersecting axes, comprising, a pair of spaced rollers, means for mounting said pair of spaced rollers for rotation about one of said shafts, the axes of rotation of said pair of spaced rollers remaining parallel to the axis of said first shaft, a third roller, and means mounting said third roller for rotation on the other of said shafts, the axis of rotation of said third roller being perpendicular to the axis of said other shaft, said third roller being arranged to contact at least one of said pair of spaced rollers for communicating motion between said pair of shafts.

8. A coupler for transmitting motion between a pair of shafts, comprising, a disk mounted perpendicular to one of said shafts, a plurality of rollers spaced from one another and mounted for rotation near the periphery of said disk, a crank mounted perpendicular to the other of said shafts, and another roller mounted for rotation on said crank, said last mentioned roller contacting at least one of said plurality of rollers along a surface thereof.

9. A coupler for joining a pair of shafts, comprising, a first rotatable member, means for mounting said first rotatable member with its axis of rotation parallel to the axis of the first shaft to be joined, a second rotatable member with the axis of rotation lying in a plane perpendicular to the axis of the other shaft to be joined, said rotatable members being arranged to transmit motion from one of said shafts to the other of said shafts through contact between said first and second rotatable members, one of said shafts having a recess provided in one of its ends for receiving the end of the other of said shafts, and means including a self-aligning bearing in said recess for joining the ends of said shafts together.

References Cited in the file of this patent

UNITED STATES PATENTS

| 805,232 | Rice | Nov. 12, 1905 |
| 1,396,132 | Lee | Nov. 8, 1921 |

FOREIGN PATENTS

| 697,774 | France | June 23, 1930 |

UNITED STATES PATENT OFFICE
CERTIFICATE OF CORRECTION

Patent No. 2,867,101                          January 6, 1959

John S. Case

It is hereby certified that error appears in the printed specification of the above numbered patent requiring correction and that the said Letters Patent should read as corrected below.

Column 3, line 20, for "and portions" read -- end portions --; column 4, line 15, for "non-interesting" read -- non-intersecting --.

Signed and sealed this 21st day of April 1959.

(SEAL)
Attest:

KARL H. AXLINE
Attesting Officer

ROBERT C. WATSON
Commissioner of Patents